United States Patent
Edholm

(10) Patent No.: US 11,676,191 B2
(45) Date of Patent: Jun. 13, 2023

(54) MULTIPLE TERM PRODUCT SEARCH AND IDENTIFICATION OF RELATED PRODUCTS

(71) Applicant: Brian E. Edholm, Worland, WY (US)

(72) Inventor: Brian E. Edholm, Worland, WY (US)

( * ) Notice: Subject to any disclaimer, the term of this patent is extended or adjusted under 35 U.S.C. 154(b) by 260 days.

(21) Appl. No.: 16/698,807

(22) Filed: Nov. 27, 2019

(65) Prior Publication Data

US 2021/0158421 A1    May 27, 2021

(51) Int. Cl.
*G06Q 30/00* (2023.01)
*G06Q 30/0601* (2023.01)
*G06F 9/54* (2006.01)

(52) U.S. Cl.
CPC ......... *G06Q 30/0629* (2013.01); *G06F 9/54* (2013.01); *G06Q 30/0633* (2013.01); *G06Q 30/0639* (2013.01); *G06Q 30/0641* (2013.01)

(58) Field of Classification Search
CPC ............ G06Q 30/00; G06Q 30/0601; G06Q 30/0607; G06Q 30/0633; G06Q 30/0641
See application file for complete search history.

(56) References Cited

U.S. PATENT DOCUMENTS

| | | | |
|---|---|---|---|
| 5,832,212 A * | 11/1998 | Cragun | G06F 16/9535 714/37 |
| 5,873,069 A | 2/1999 | Reuhl et al. | |
| 5,917,483 A | 6/1999 | Duncan et al. | |
| 5,960,411 A | 9/1999 | Hartman et al. | |
| 6,076,070 A | 6/2000 | Stack | |
| 6,128,600 A | 10/2000 | Imamura et al. | |
| 6,166,736 A | 12/2000 | Hugh | |
| 6,256,028 B1 | 7/2001 | Sanford et al. | |
| 6,336,099 B1 * | 1/2002 | Barnett | G06Q 30/0271 705/14.35 |
| 6,369,840 B1 | 4/2002 | Barnett et al. | |
| 6,434,530 B1 | 8/2002 | Sloane et al. | |
| 6,574,608 B1 | 6/2003 | Dahod et al. | |

(Continued)

FOREIGN PATENT DOCUMENTS

| | | |
|---|---|---|
| JP | 2956661 B2 | 10/1999 |
| JP | H11338927 A | 12/1999 |

(Continued)

OTHER PUBLICATIONS

Shen, Xiaohui, et al. "Mobile product image search by automatic query object extraction." European conference on computer vision. Springer, Berlin, Heidelberg, 2012. (Year: 2012).*

(Continued)

*Primary Examiner* — Christopher B Seibert
(74) *Attorney, Agent, or Firm* — Terrence J. Edwards; TechLaw Ventures, PLLC

(57) ABSTRACT

Efficient systems and methods for multiple-term searching and product ordering. A method includes receiving a plurality of independent search requests from a user and executing a product search for each of the plurality of independent search requests to generate a plurality of independent product results. The method includes providing at least a portion of the plurality of independent product results to the user simultaneously. The method includes receiving a product selection from the user and adding the product selection to a virtual shopping cart for the user while continuing to display at least a portion of the plurality of independent product results.

23 Claims, 11 Drawing Sheets

(56) References Cited

U.S. PATENT DOCUMENTS

| | | |
|---|---|---|
| 6,578,030 B1 | 6/2003 | Wilmsen et al. |
| 6,604,088 B1 | 8/2003 | Landom et al. |
| 6,741,268 B1 | 5/2004 | Hayakawa |
| 6,745,636 B2 | 6/2004 | Rainin et al. |
| 6,754,636 B1 | 6/2004 | Walker et al. |
| 6,801,227 B2 | 10/2004 | Bocionek et al. |
| 6,850,255 B2 | 2/2005 | Mushetto |
| 6,850,988 B1 | 2/2005 | Reed |
| 6,873,967 B1 | 3/2005 | Kalagnanam et al. |
| 6,970,838 B1 | 11/2005 | Kamath et al. |
| 6,970,840 B1 | 11/2005 | Yu et al. |
| 6,976,228 B2 | 12/2005 | Bernhardson |
| 7,000,180 B2 | 2/2006 | Balthasar |
| 7,013,290 B2 | 3/2006 | Ananian |
| 7,017,119 B1 | 3/2006 | Johnston et al. |
| 7,035,816 B2 | 4/2006 | Jankelewitz |
| 7,047,499 B2 | 5/2006 | Ferri |
| 7,055,105 B2 | 5/2006 | Windl et al. |
| 7,062,453 B1 | 6/2006 | Clarke |
| 7,082,426 B2 | 7/2006 | Musgrove et al. |
| 7,099,833 B1 | 8/2006 | Sundaresan |
| 7,216,093 B1 | 5/2007 | Gupta et al. |
| 7,356,490 B1 | 4/2008 | Jacobi et al. |
| 7,506,028 B2 | 3/2009 | Mohr |
| 7,584,135 B1 | 9/2009 | McAllister et al. |
| 7,716,084 B2 | 5/2010 | Van Etten et al. |
| 8,359,642 B1* | 1/2013 | Wurtenberger ......... G06F 21/10 726/1 |
| 8,875,257 B1* | 10/2014 | Wurtenberger .... H04N 21/4542 715/752 |
| 8,972,895 B2 | 3/2015 | Gonsalves et al. |
| 2001/0005833 A1 | 6/2001 | Asami et al. |
| 2001/0014868 A1 | 8/2001 | Herz et al. |
| 2001/0032142 A1 | 10/2001 | Jeon et al. |
| 2002/0002531 A1 | 1/2002 | Lustig et al. |
| 2002/0007322 A1 | 1/2002 | Stromberg |
| 2002/0010654 A1 | 1/2002 | Yonezawa |
| 2002/0053076 A1 | 5/2002 | Landesmann |
| 2002/0059196 A1 | 5/2002 | L'Anson et al. |
| 2002/0099642 A1 | 7/2002 | Schwankl et al. |
| 2002/0111863 A1 | 8/2002 | Landesmann |
| 2002/0147674 A1 | 10/2002 | Gillman |
| 2002/0156686 A1 | 10/2002 | Kraft et al. |
| 2002/0161658 A1 | 10/2002 | Sussman |
| 2002/0161757 A1* | 10/2002 | Mock ...................... G06F 16/24 707/999.005 |
| 2002/0178013 A1 | 11/2002 | Hoffman et al. |
| 2003/0005046 A1 | 1/2003 | Kavanagh et al. |
| 2003/0028394 A1 | 2/2003 | Alzer et al. |
| 2003/0033205 A1 | 2/2003 | Nowers et al. |
| 2003/0046176 A1 | 3/2003 | Hynes |
| 2003/0065805 A1 | 4/2003 | Barnes, Jr. |
| 2003/0083961 A1 | 5/2003 | Bezos et al. |
| 2003/0084059 A1 | 5/2003 | Kelley et al. |
| 2003/0115114 A1 | 6/2003 | Tateishi et al. |
| 2003/0139976 A1 | 7/2003 | Hanai et al. |
| 2003/0167209 A1 | 9/2003 | Hseih |
| 2003/0200156 A1 | 10/2003 | Roseman et al. |
| 2003/0204447 A1 | 10/2003 | Dalzell et al. |
| 2003/0204449 A1 | 10/2003 | Kotas et al. |
| 2003/0220835 A1 | 11/2003 | Barnes, Jr. |
| 2003/0233278 A1 | 12/2003 | Marshall |
| 2004/0010456 A1 | 1/2004 | Hoang |
| 2004/0015415 A1 | 1/2004 | Cofino et al. |
| 2004/0111671 A1 | 6/2004 | Lu et al. |
| 2004/0117384 A1* | 6/2004 | Ray ........................ G06Q 20/04 |
| 2004/0225569 A1 | 11/2004 | Bunnell |
| 2005/0010857 A1 | 1/2005 | Schmukler et al. |
| 2005/0091127 A1 | 4/2005 | Saltel et al. |
| 2005/0125301 A1* | 6/2005 | Muni ...................... G06Q 30/06 705/23 |
| 2005/0154652 A1 | 7/2005 | Bezos et al. |
| 2005/0177474 A1 | 8/2005 | Ma |
| 2005/0197927 A1 | 9/2005 | Martineau et al. |
| 2006/0085741 A1 | 4/2006 | Weiner et al. |
| 2007/0022020 A1 | 1/2007 | Bernstein |
| 2007/0150362 A1* | 6/2007 | Sharma ............... G06Q 30/0603 705/26.8 |
| 2007/0256093 A1* | 11/2007 | Hiler ..................... H04N 21/472 725/28 |
| 2008/0010170 A1* | 1/2008 | Chan .................... G06Q 10/087 705/28 |
| 2008/0155614 A1* | 6/2008 | Cooper ................. H04N 21/222 705/26.1 |
| 2009/0240518 A1* | 9/2009 | Borom ............... G06Q 30/0601 705/14.1 |
| 2010/0011322 A1* | 1/2010 | Billmaier ........... H04N 21/4438 715/830 |
| 2011/0093361 A1 | 4/2011 | Morales |
| 2011/0307280 A1* | 12/2011 | Mandelbaum ....... G06Q 10/025 705/6 |
| 2012/0006891 A1* | 1/2012 | Zhou ...................... G06Q 30/06 235/380 |
| 2013/0047115 A1* | 2/2013 | Migos ................... G06F 3/0484 715/776 |
| 2014/0378204 A1* | 12/2014 | Michel ................. G07F 17/329 463/17 |
| 2015/0012381 A1 | 1/2015 | Lazaro |
| 2015/0046216 A1 | 2/2015 | Adjaoute |
| 2015/0212710 A1* | 7/2015 | Gupta ................ G06Q 30/0641 715/765 |
| 2016/0350836 A1* | 12/2016 | Burns ............... G06Q 30/0625 |
| 2018/0005305 A1* | 1/2018 | Hirsch ............... G06Q 30/0625 |
| 2018/0217990 A1* | 8/2018 | Kumar ................ G06F 16/3329 |

FOREIGN PATENT DOCUMENTS

| | | |
|---|---|---|
| JP | 2000020591 A | 1/2000 |
| JP | 2001022824 A | 1/2001 |
| JP | 2001022847 A | 1/2001 |
| JP | 2001312658 A | 11/2001 |
| JP | 4999224 B2 | 8/2012 |

OTHER PUBLICATIONS

International Search Report and Written Opinion Received from PCT Application No. PCT/US20/60680, dated Mar. 23, 2021, 9 pages.

* cited by examiner

MULTIPLE TERM PRODUCT SEARCH AND IDENTIFICATION OF RELATED PRODUCTS

TECHNICAL FIELD

The disclosure relates generally to systems, methods, and devices for multiple term search engines and order fulfilment processes. More specifically, the disclosure relates to systems, methods, and devices for increasing efficiency in searching for products, identifying matching products, identifying related products, and selecting products to be ordered.

BACKGROUND

There are numerous industries that benefit from efficiently identifying and purchasing multiple products by way of a computer user interface. In some instances, it may be necessary to quickly identify available products, order those products, and have them delivered within a specified timeframe. An example industry that may require quick order fulfilment is the construction industry. Commonly in the construction industry, contractors will be present on a jobsite and determine there are not enough construction materials onsite to complete the job. In such an instance, it may be desirable to quickly place an order for the necessary materials and have those materials delivered to the jobsite within a specified timeframe.

However, traditional order fulfilment processes suffer from numerous deficiencies and fail to deliver efficient processes for searching for multiple products and placing an order for multiple products. Traditional order fulfilment processes are limited to searching only one item at a time and adding only one item at a time to a user's virtual shopping cart. Further, traditional order fulfilment processes are limited to searching inventory for only one manufacturer or retailer. These deficiencies can lead to loss of time and money in certain industries such as the construction industry.

In light of the foregoing, disclosed herein are systems, methods, and devices for a multiple term search engine and multiple product order placement platform.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 6 is an example screenshot of a home screen of an order placement platform suggesting multiple potential product categories to be searched, wherein multiple product categories have been selected to be searched simultaneously;

FIG. 7 is an example screenshot of a search results page presenting potential products pertaining to a plurality of search requests that were searched simultaneously;

DETAILED DESCRIPTION

Figure 1:
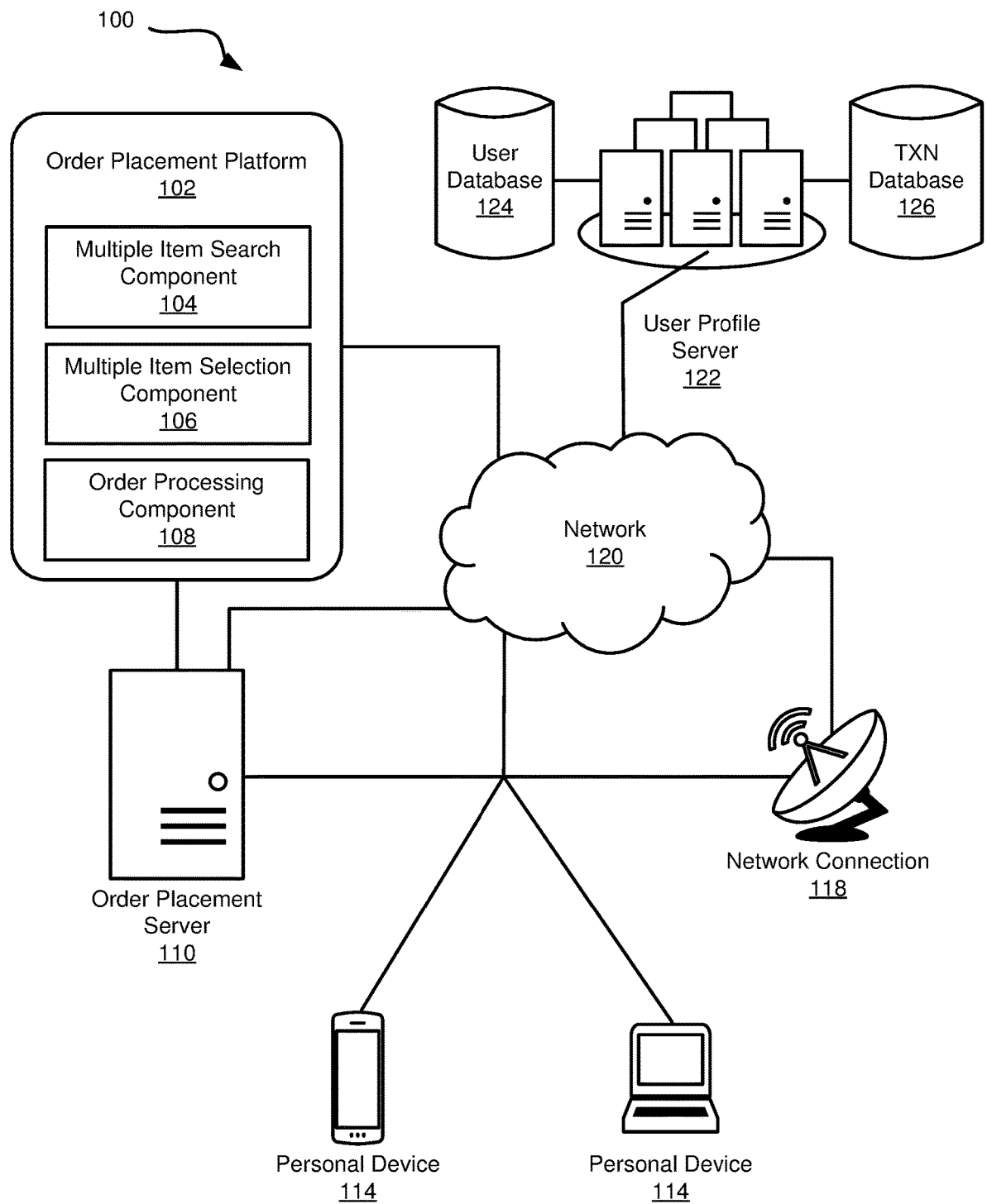
FIG. 1 is a schematic diagram of a system for efficient multiple-term searching, related product identification, and order processing.

Disclosed herein are systems, methods, and devices for increasing efficiency in searching for products, identifying matching products, identifying related products, and selecting products to be ordered. In an embodiment, an order placement platform enables a user to execute multiple searches for different search terms or items at one time. Further, the order placement platform enables the user to identify related products and add multiple products to a virtual shopping cart simultaneously.

There are numerous industries that benefit from efficiently identifying and purchasing multiple products by way of a computer user interface. In some instances, it may be necessary to quickly identify available products, order those products, and have them delivered within a specified timeframe. An example industry that may require quick order fulfilment is the construction industry. Commonly in the construction industry, contractors will be present on a jobsite and determine there are not enough construction materials onsite to complete the job. In such an instance, it may be desirable to quickly place an order for the necessary materials and have those materials delivered to the jobsite within a specified timeframe.

However, traditional order fulfilment processes suffer from numerous deficiencies and fail to deliver efficient processes for searching for multiple products and placing an order for multiple products. Traditional order fulfilment processes are limited to searching only one item at a time and adding only one item at a time to a user's virtual shopping cart. Further, traditional order fulfilment processes are limited to searching inventory for only one manufacturer or retailer. These deficiencies can lead to loss of time and money in certain industries such as the construction industry.

In light of the foregoing, disclosed herein are systems, methods, and devices for a multiple term search engine and multiple product order placement platform.

Before the structures, systems, and methods for increasing efficiency of an order placement platform are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 is a schematic diagram of a system 100 for an efficient ordering and product searching platform. The system 100 can be implemented to permit a user to conduct multiple searches simultaneously and add multiple products to a virtual shopping cart simultaneously. The system 100 includes an order placement platform 102 in communication with an order placement server 110 and a network 120. The network 120 is in communication with the order placement server 110 and a user profile server 122. In an embodiment, the order placement server 110 and the user profile server 122 are on the same physical device or are electrically interconnected. Access to the network 120 may be facilitated by a personal device 114 such as a computer, mobile phone, smart phone, web browser, tablet, and so forth.

The order placement platform 102 includes one or more of a multiple item search component 104, a multiple item selection component 106, and an order processing component 108. The order placement platform 102 may include further components and may be configured to perform additional instructions, for example according to the order placement platform 102 as discussed in FIG. 2. The order placement platform 102 may be accessed by way of a personal device 114 such as a smart phone, a tablet, a laptop, a personal computer, and so forth.

In an embodiment, the order placement platform 102 provides a means for a user to purchase items directly from a retailer or manufacture connected with the order placement platform 102. This can be referred to as a consumer purchasing products from the order placement platform 102. Additionally, the order placement platform may provide a means for a user to purchase items through the order placement platform 102 that are not directly owned, supplied, or manufactured by a company that is connected with the order placement platform 102. This can be referred to as a consumer purchasing products through the order placement platform 102. Therefore, the order placement platform 102 may serve as a product searching and product purchasing platform that is supplied to consumers directly by a retailer or manufacture. Further, the order placement platform 102 may serve as a product searching and product purchasing platform that is supplied to consumers by a third party and includes products from one or more retailers or manufacturers. It should be appreciated that the order placement platform 102 may be a combination of the aforementioned embodiments, wherein the order placement platform 102 is a product searching and product purchasing platform that is supplied to consumers directly by a retailer or manufacturer, and further includes additional products from additional retailers or manufactures.

The multiple item search component 104 enables a user to perform multiple searches simultaneously. In an embodiment, a user may input multiple search terms or search keys for different products, and the multiple item search component 104 will perform individual product searches simultaneously. The multiple item search component 104 can reduce the total time spent searching for and identifying suitable products. In a further embodiment, the multiple item selection component 104 performs independent searches for a plurality of search requests from a user, and further performs independent searches for related items corresponding with each of the plurality of search requests.

The multiple item selection component 106 enables a user to select multiple products and view those products simultaneously. The multiple item selection component 106 further enables a user to add multiple products to a virtual shopping cart at the same time. The multiple item selection component 106 reduces the time spent selecting and ordering products.

In an embodiment, the multiple item selection component 106 prompts a user to select one or more products from a product group. The multiple item selection component 106 may generate the product group through machine learning by analyzing past orders and identifying products that are commonly ordered as a group. The product group may be directed to a certain project or field of interest. In an example use case, the product group is directed to installing drywall in a property, and the product group may include drywall sheets, drywall screws, drywall tape, mud, and various tools for completing the drywall installation job.

The order processing component 108 finalizes an order by facilitating payment processing, sending order details to a products provider such as a retailer or manufacturer, and sends an order confirmation to a purchaser. In an embodiment, the order processing component 108 provides access to transaction information such as user profiles, payment information, transaction histories, and so forth. The order processing component 108 may provide a user the ability to select a certain user profile and view the transaction history and/or the status of the payment information for that user profile. In an embodiment, all sensitive information, such as personally identifiable information (PII) or payment information, in the user database 124 and/or the transaction database 126 is encrypted and cannot be read by a human.

The order placement server 110 provides access to the order placement platform 102 to personal devices 114. The order placement server 110 may serve as a dedicated server group to support the order placement platform 102 for all devices 114 interacting with the order placement platform 102. In an embodiment, the order placement server 110 and the user profile server 122 are on the same physical device or are in direct electrical communication. In an embodiment, there is no distinction between the order placement server 110 and the user profile server 122.

The personal device 114 is any personal computing device that can communicate with the order placement server 110 and/or the user profile server 122. The personal device 114 may include a smart phone, a tablet, a laptop, a personal computer, and so forth. Personal devices 114 may communicate with the order placement server 110 and/or the user profile server 122 by way of a local area network (LAN), wide area network (WAN), or another network connection. In an embodiment, personal devices 114 can connect to a network 120, such as a cloud computing network or the Internet, by way of a network connection 118 that may be facilitated by the order placement server 110 and/or the user profile server 122.

The user profile server 122 facilitates interactions with a user database 124 storing user profile information and/or a transaction database 126 storing transaction history information. The user profile server 122 may be in communication with a network 120 such as a cloud computing network. In an embodiment, the order placement server 110 is in communication with the user profile server 122 by way of the network 120 such that new user profiles may be uploaded from the user profile server 122 to the order placement server 110. In an embodiment, a single server includes the information stored in the user profile server 122 and the order placement server 110. In an embodiment, the information stored in the user profile server 122 includes sensitive information such as personally identifiable information, and the information is therefore encrypted and safeguarded.

In an embodiment as illustrated in FIG. 1, the order placement server 110 is independent of the user profile server 122. This may be desirable in an instance where the order placement platform 102 connects to a third-party server or database that comprises user profile information. For example, a third-party service might exist that catalogs user profile information for numerous retail or manufacturing entities. The order placement platform 102 may connect with such a third-party service to obtain user profile information or payment information. In an embodiment, the order placement platform 102 connects with the third party by way of an Application Program Interface (API). In an embodiment, the order placement platform 102 receives user profile information from a third-party user profile service by way of the user profile server 122.

In an embodiment (not shown in FIG. 1), the order placement server 110 and the user profile server 122 are not independent of one another. In such an embodiment, a single server group may include all information necessary for running the order placement platform 102, including user profile information, payment information, transaction history, and/or information specific to one or more retail establishments. It should be appreciated that numerous different configurations may be used without departing from the scope of the disclosure.

The user database 124 is in communication with the user profile server 122. The user database 124 stores information about user accounts that are associated with the order placement platform 102. The user database 124 stores information about each user that has created an account with the order placement platform 102. The user database 124 stores, for example, personal user information, user preferences, user advertising preferences, user reward history, user reward redemptions, user behavior when interacting with the order placement platform, information about the user's profession or line of work, and so forth.

The transaction database 126 is in communication with the user profile server 122. The transaction database 124 stores a listing of transactions for all users. The transactions may be applicable to multiple retail locations or entities. The transaction database 126 includes a listing of orders for each user that interacts with the order placement platform 102. The transaction database 126 may further including information about search histories, products viewed by users, wish lists associated with a user account, and so forth.

The network connection 118 provides users access to the network 120. The network 120 may include a cloud computing network, and/or the Internet, and/or part of a closed or private network. The network connection 118 may provide the order placement server 110 access to the network 120 and may further provide any of the personal devices 114 access to the network 120.

Figure 2:
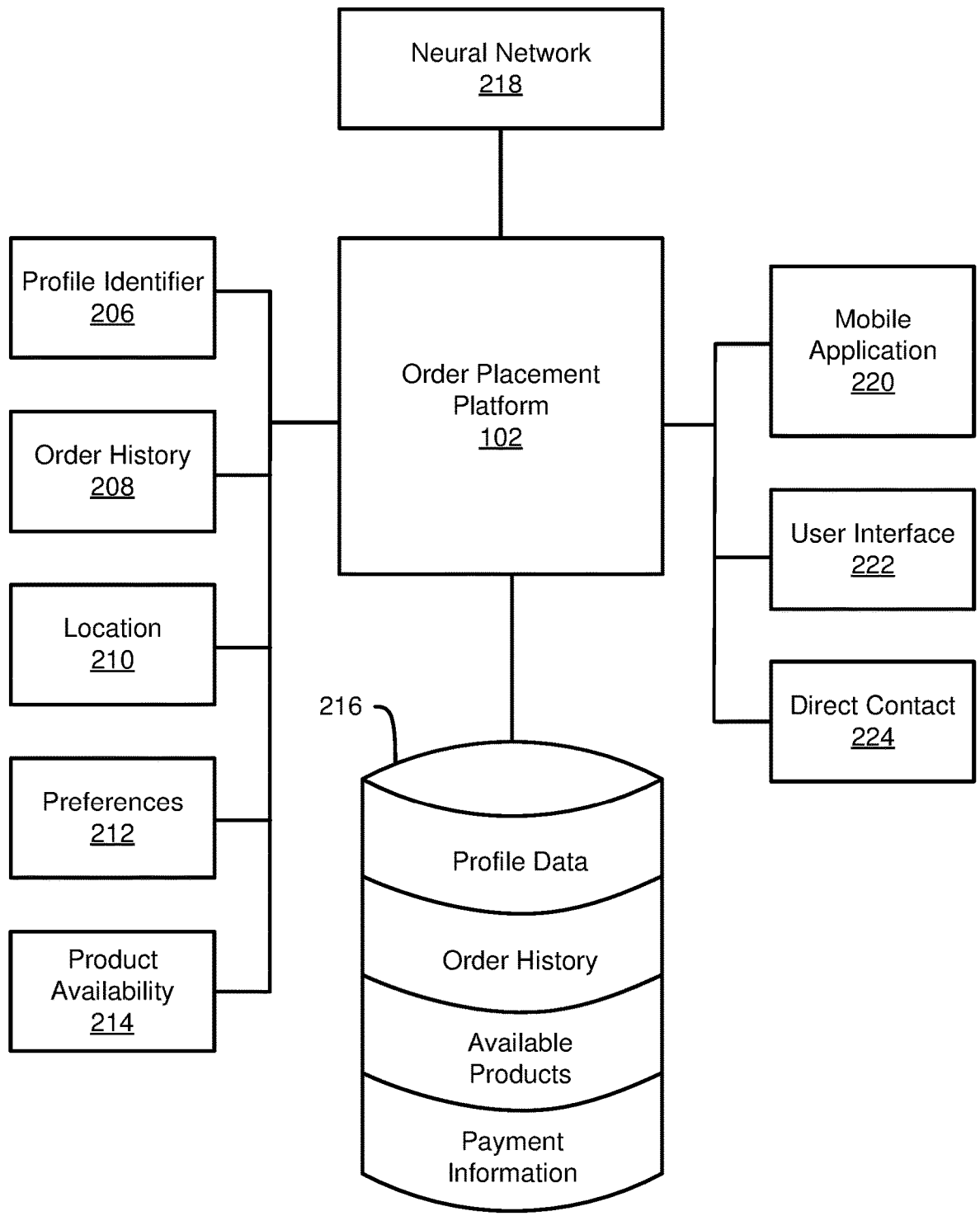
FIG. 2 is a schematic diagram of an information flow for an order placement platform.

FIG. 2 is a schematic diagram of the order placement platform 102 including an indication of data categories that may be used by the order placement platform 102. The order placement platform 102 may receive multiple types of information and use that information to predict the product needs for a specific user. In an embodiment, the order placement platform 102 uses profile identifier 206 information, order history 208 information, location 210 information, user preference 212 information, and/or product availability 214 information to determine what products should be suggested to a user and/or which products the user may wish to order. The order placement platform 102 may be in communication with multiple output sources, including a mobile application 220, a user interface 222 that may be a web-based user interface, and direct contact 224 with users, contractors, firms, manufacturers, retailers, and others. The order placement platform 102 may be in communication with a database 116 storing any suitable data, including profile data, order history data, information about available products, payment information, and more. The order placement platform 102 may work in connection with a neural network 218 to recognize which products should be suggested to a user or which products a user may wish to order.

In an embodiment, the order placement platform 102 further receives data by way of one or more application program interfaces (APIs). The order placement platform 102 may receive user-specific data, environmental data, order history data, product availability information, product popularity information, and aggregate data that is deemed relevant for training a neural network 218 or analyzing the user's inputs. The environmental data includes, for example, weather data such as temperature, cloud coverage, and precipitation, lunar cycle data, sunrise time, sunset time, hours of daylight per day, UV index, and so forth. The environmental data may be useful to the neural network 218 to identify that certain products may be more desirable during certain seasons or weather patterns. The order placement platform 102 may receive aggregate data by way of an API.

The profile identifier 206 include metrics entered by a user or imputed to a user by the neural network 218 for different categories. Example metrics include the user's age, demographic information, socioeconomic status, profession, location, and so forth. The user's profession may be particularly useful in an embodiment where the order placement platform 102 provides products that are used in a professional setting. The user's demographic information and socioeconomic status can be useful in identifying certain products that are more likely to be seen as desirable by the user.

The location 210 information may include information about the user's residence, the user's place of business, and/or the user's current location based on GPS sensor data. The location 210 information can be analyzed to identify products that are available locally near the user's current location, residential address, or professional address. In an embodiment, the location 210 information is analyzed in furtherance of identifying products that are immediately available nearby for prompt delivery to the user's location.

The preferences 212 includes information about the user's ordering preferences, product preferences, and so forth. The preferences 212 may be determined by the neural network 218 or some other machine learning based on the user's past interactions with the order placement platform 102. The preferences 212 may be manually input by the user.

The product availability 214 includes information about products that are available locally or to be shipped. The product availability 214 may include a listing of available products and the associated SKU or other identifying information. The product availability 114 may include an inventory account for each of the available products. The product availability 214 may be pulled via an API. The product availability 214 may be pulled for multiple retail entities, retail locations, manufacturer entities, and so forth. In an embodiment, the product availability 214 information is analyzed across multiple retail or manufacturing entities to identify where all products in the user's virtual shopping cart could be purchased in a single shopping event.

Figure 5:
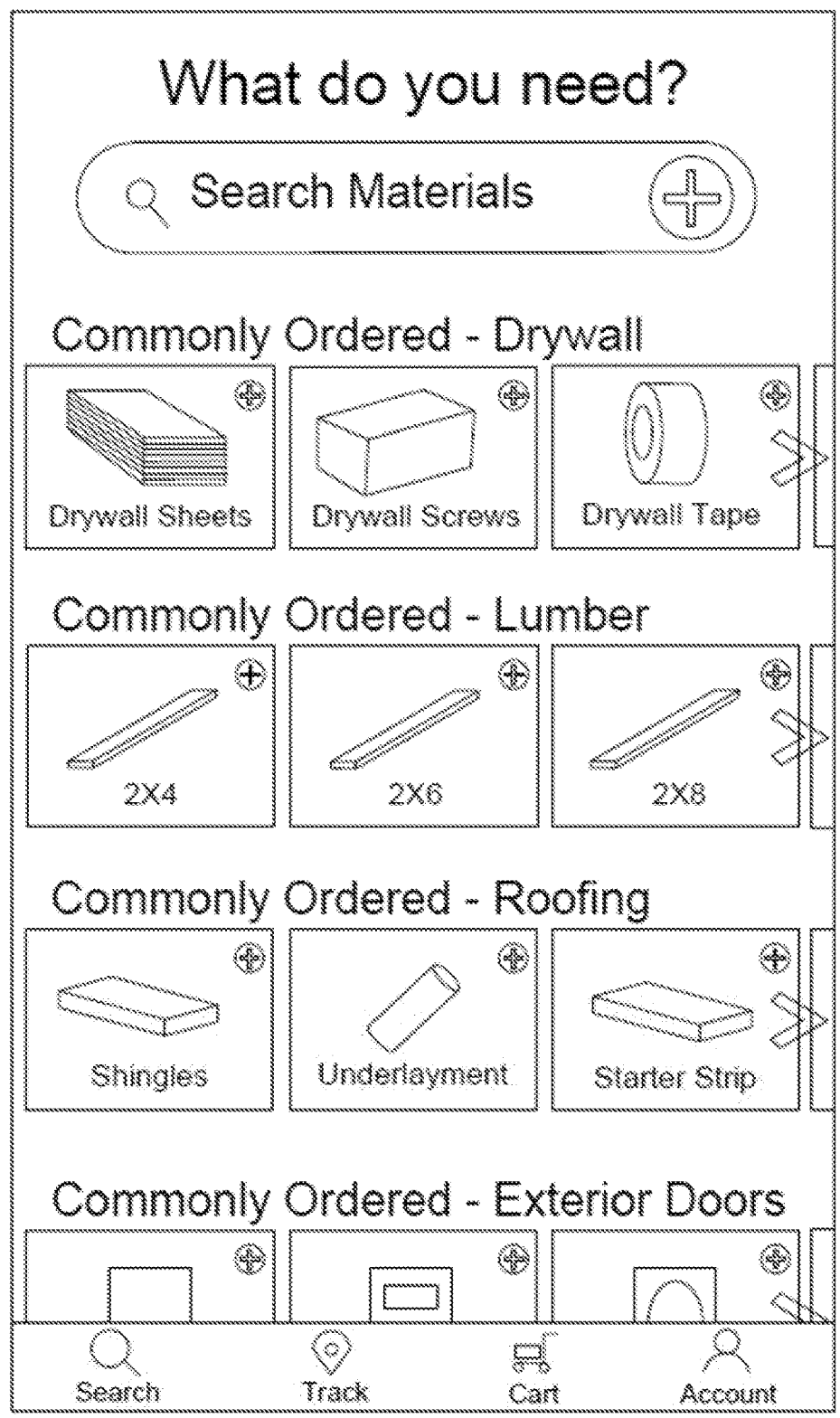
FIG. 5 is an example screenshot of a home screen of an order placement platform suggesting multiple potential product categories to be searched.
Figure 6:
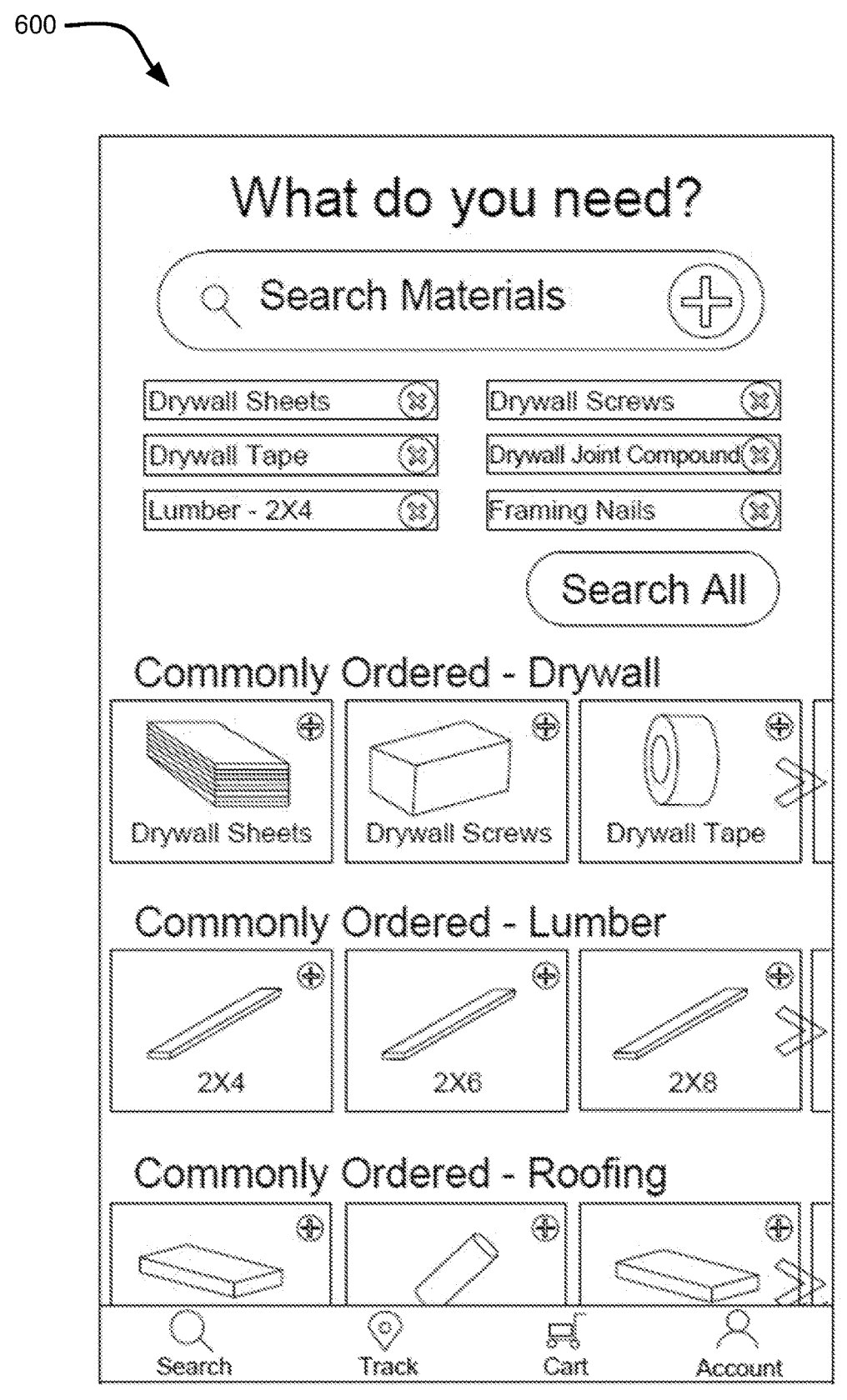
Figure 7:
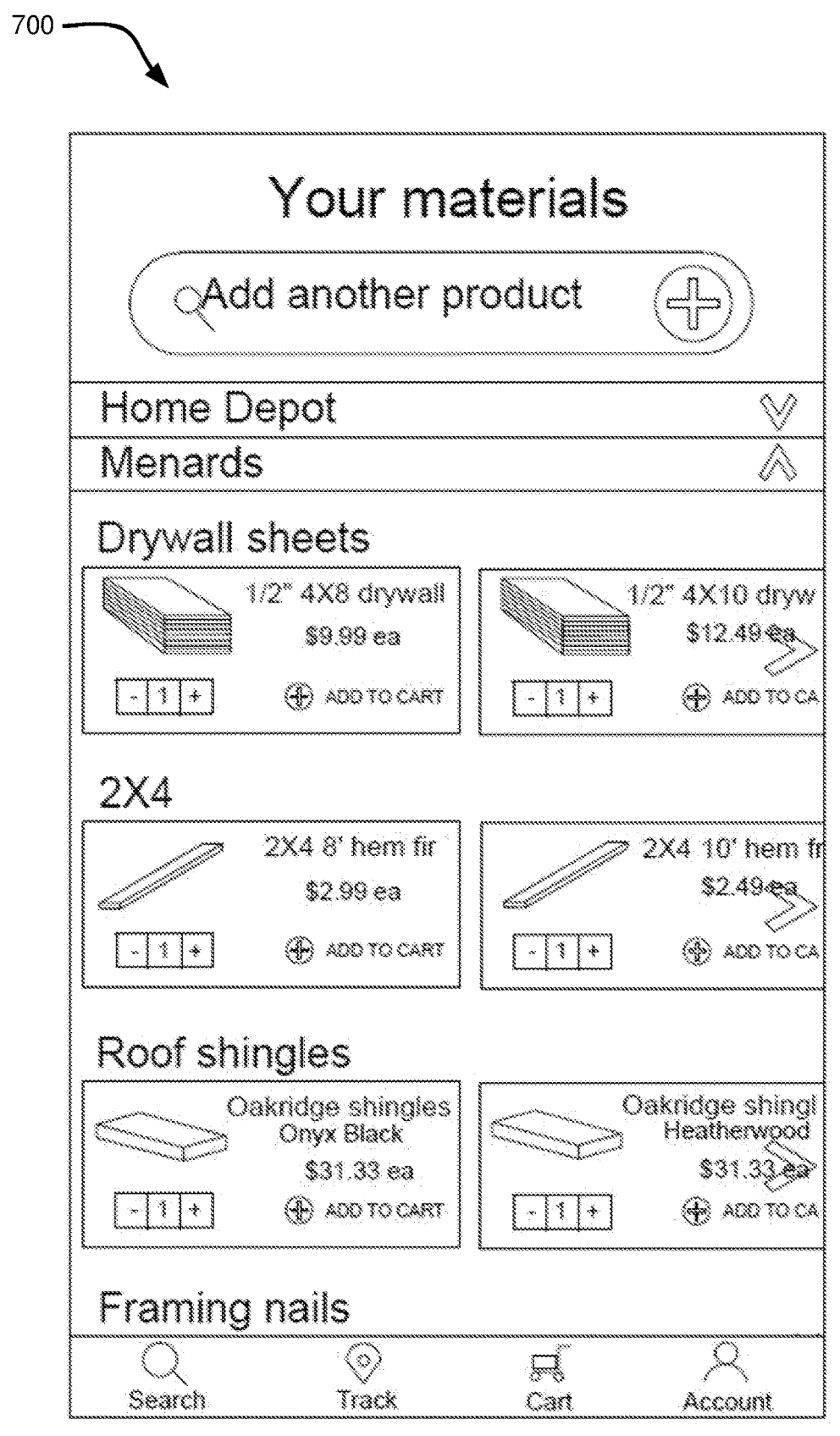

The mobile application 220 and user interface 222 are platforms in which a user may interact with the order placement platform 102. Example screenshots of a mobile application 220 are depicted in FIGS. 5-7. The order placement platform 102 may be accessible to a user by way of a mobile phone application 220, a user interface 222 on a website, a software platform, and so forth.

The direct contact 224 is a means by which the order placement platform 102 can contact or notify one or more persons or entities directly. The direct contact 224 may include a telephone call, a voicemail message, an email, a text message, and so forth.

In an embodiment, information is processed by a neural network 218 to make predictions about user behavior. The neural network 218 may be trained on aggregated behavior of a plurality of users of the order placement platform 102. The neural network 218 may be trained on a dataset comprising real-life information and/or virtual information for shopping and ordering behavior for different users. The neural network 218 may make predictions about user behavior based on one or more of the user's demographic information, location, professional background, order history, transaction history, and so forth. In an example, the neural network 218 predicts that a user will want to search certain products based on the user's demographic information, income bracket, location, or professional background. The neural network 218 may make these predictions by being trained on aggregate shopping information for a plurality of individuals.

Figure 3:
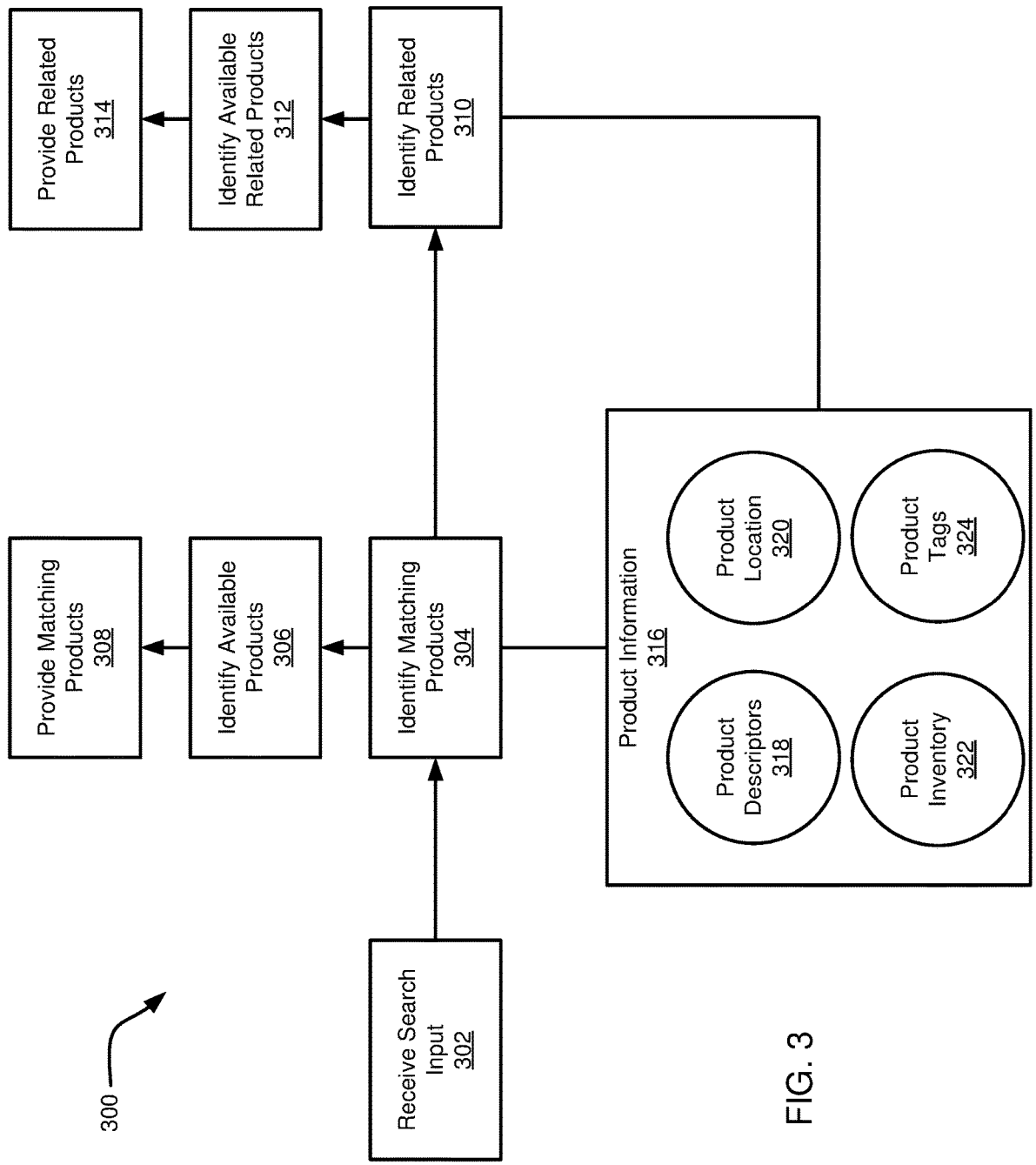
FIG. 3 is a schematic diagram of a process flow receiving and processing a search input for one or more search requests.

FIG. 3 is a schematic diagram of a process flow 300 for implementing a multiple term search engine and multiple product ordering system. The process flow 300 includes receiving a search input at 302. The search input may include search terms that are manually input by the user, search terms that are suggested to the user and then selected or dismissed by the user, and/or may be based on the user's order history. The search input may include multiple search terms to be searched simultaneously.

The process flow 300 continues and includes identifying matching products at 304 based on the search input. The process flow 300 further includes identifying available products at 306 based on current inventory or a listing of available products. The process flow 300 includes providing the matching products at 308 to the user. The matching products may include all products falling under the search term or may include only those products falling under the search term that are currently available.

The process flow 300 includes identifying related products at 310. Related products may be determined based on past ordering history for the user or for others that have ordered on the platform. The related products may be identified by a neural network 218 or other machine learning system configured to analyze large sums of data to identify which products are likely to be purchased as a group. The process flow 300 includes identifying available related products at 312 based on current inventory or a listing of available products. The process flow 300 includes providing the related products at 314 to the user.

In an embodiment, the search is carried about based on product information 316. The product information may be stored in a database accessible over a network, may be stored locally to a computing device executing the ordering platform, may be accessed by way of an API, and so forth. The product information 316 includes one or more of product descriptors 318, product location 320 information, product inventory 322, product tags 324, and others. The product descriptors 318 include information about the product such as name, SKU or other unique identifier, manufacturing information, various descriptive information relevant to the product, reviews pertaining to the product, and so forth. The product location 320 includes information about where the product is located, the shipping rates to move the product from its initial location to the user's location, whether the product is immediately available locally, and so forth. The product inventory 322 includes information about how much of the product is available locally, how much of the product could be shipped, how much of the product could be delivered, and so forth. The product tags 324 include identifiers pertaining to the product category or interest field. The product tags 324 may be manually input by a system administrator, user, or manufacturer. The product tags 324 may be determined by a neural network 218 based on past ordering histories for many people. In an example, product tags 324 for copper wires may include identifiers such as "electrical," "construction," "copper," and "wiring."

Figure 4:
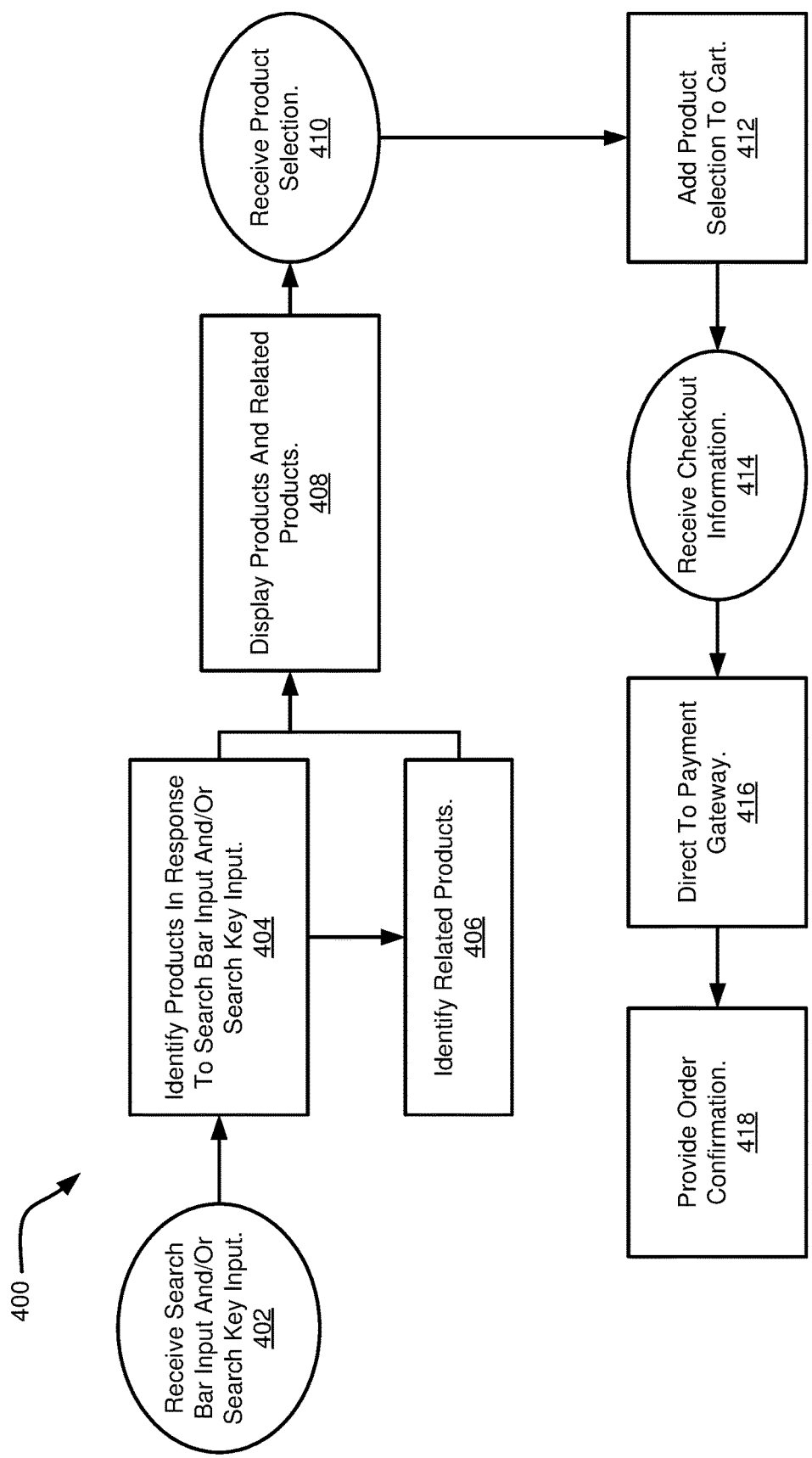
FIG. 4 is a schematic diagram of a process flow for receiving a search input and identifying products related to the search input for processing a product order.

FIG. 4 is a schematic diagram of a process flow 400 for receiving and processing search inputs in furtherance of processing an order. The process flow 400 may be executed by an order placement server 110 operating an order placement platform 102 as discussed herein. The process flow 400 includes receiving at 402 a search bar input and/or search key input. A search bar input may include words or characters manually input into a search bar by a user. A search key input may include one or more category selections by a user. In response to receiving the search input, the process flow 400 includes identifying at 404 products in response to the search bar input and/or the search key input. This step includes identifying products matching the search input. The process flow 400 further includes identifying at 406 related products that are not directly encompassed by the search input but may be similar to or related to the search input products. In an example, related products may include other materials or products that are necessary for completing a job or task with the primary product. The process flow includes displaying at 408 the products and related products. The process flow 400 includes receiving at 410 product selections from the user. The process flow 400 includes adding at 412 the product selections to the user's virtual shopping cart. In an embodiment, adding at 412 the product selections may include adding multiple different products to the virtual shopping cart simultaneously. The process flow 400 includes receiving at 414 checkout information such as name, delivery address, and so forth. The process flow 400 includes directing at 416 a user to a payment gateway where the user may input information to process payment for the product selections. The process flow 400 includes providing at 418 order confirmation to the user by way of a message such as an email, text message, phone call, push notification, and so forth.

FIGS. 5-7 illustrate example screenshots of a user interface for an order placement platform 102 as discussed herein.

FIG. 5 is an example screenshot of a home screen 500 for the user interface of the order placement platform 102. In an embodiment, the home screen 500 provides search suggestion and/or product suggestion to the user based on factors. Pertinent factors may include, for example, the user's profession, the user's order history, the user's manually input preferences, the user's preferences as determined by a neural network or other machine learning process, the user's demographic information, the user's salary range, and so forth.

In an embodiment, a user may interact with the home screen 500 by selecting multiple suggested products at once. In an embodiment, the user may activate a plus sign or other button to indicate that the user wants to add that product to a virtual shopping cart, learn more about that product, open up a quick view tab for that product, and so forth. In an embodiment, the user may quickly add multiple different products to the user's virtual shopping cart by activating a plus sign or other button associated with each suggested product. In an embodiment, the user may quickly add multiple products or product types to search by activating the plus sign or other button associated with each suggested product.

In the example implementation illustrated in FIG. 5, the home screen 500 is particularly directed to use by a construction contractor, construction company, do-it-yourself enthusiast, user undergoing a construction project, and so forth. The home screen 500 provides numerous construction-related suggestions to the user including drywall products, lumber products, roofing products, and exterior door products. It should be appreciated that the home screen 500 may be specialized based on which retail entity or manufacturer is connected to the order placement platform 102, which user is connected to the order placement platform 102, the user's location or delivery address when connecting to the order placement platform 102, and any other suitable factors.

FIG. 6 is an example screenshot of a home screen 600 wherein a user has selected multiple products or product categories to be searched. In the example implementation illustrated in FIG. 6, the user has selected drywall sheets, drywall tape, lumber—2×4, drywall screws, drywall joint compound, and framing nails to be searched. The user may select the "Search All" button to indicate that the user is ready to search each of the drywall sheets, drywall tape, lumber—2×4, drywall screws, drywall joint compound, and framing nails simultaneously. The user may additionally manually enter in product names, product categories, or other search terms in the "Search Materials" box. In an embodiment, there is a limit to how many search terms the user may input for a single searching session. In an alternative embodiment, there is no limit to how many search terms the user may input for a single searching session.

FIG. 7 is an example screenshot of an ordering page 700 of a user interface for the order placement platform 102. The ordering page 700 includes means for a user to select specific products, to view local or deliverable available of the products, view pricing for the products, view product information, and so forth. The ordering page 700 may indicate multiple different retailers offering the same products and may enable a user to select products from multiple different retailers. In the example ordering page 700 illustrated in FIG. 7, a user may view products offered by the "Home Depot" retailer and the "Menards" retailer.

In an embodiment, the user may view available products under each search term entered by the user (see FIGS. 5-6). In an example use case, a user enters search inputs to search drywall sheets, lumber—2×4, roof shingles, and framing nails simultaneously. As a result of this search input, the user may be directed to the ordering page 700 illustrated in FIG. 7. The user may then select drywall sheets, lumber—2×, roof shingles, and framing nails on the same page. This reduces the total time spent selecting products and ordering products and simplifies the shopping process for the user.

Figure 8:
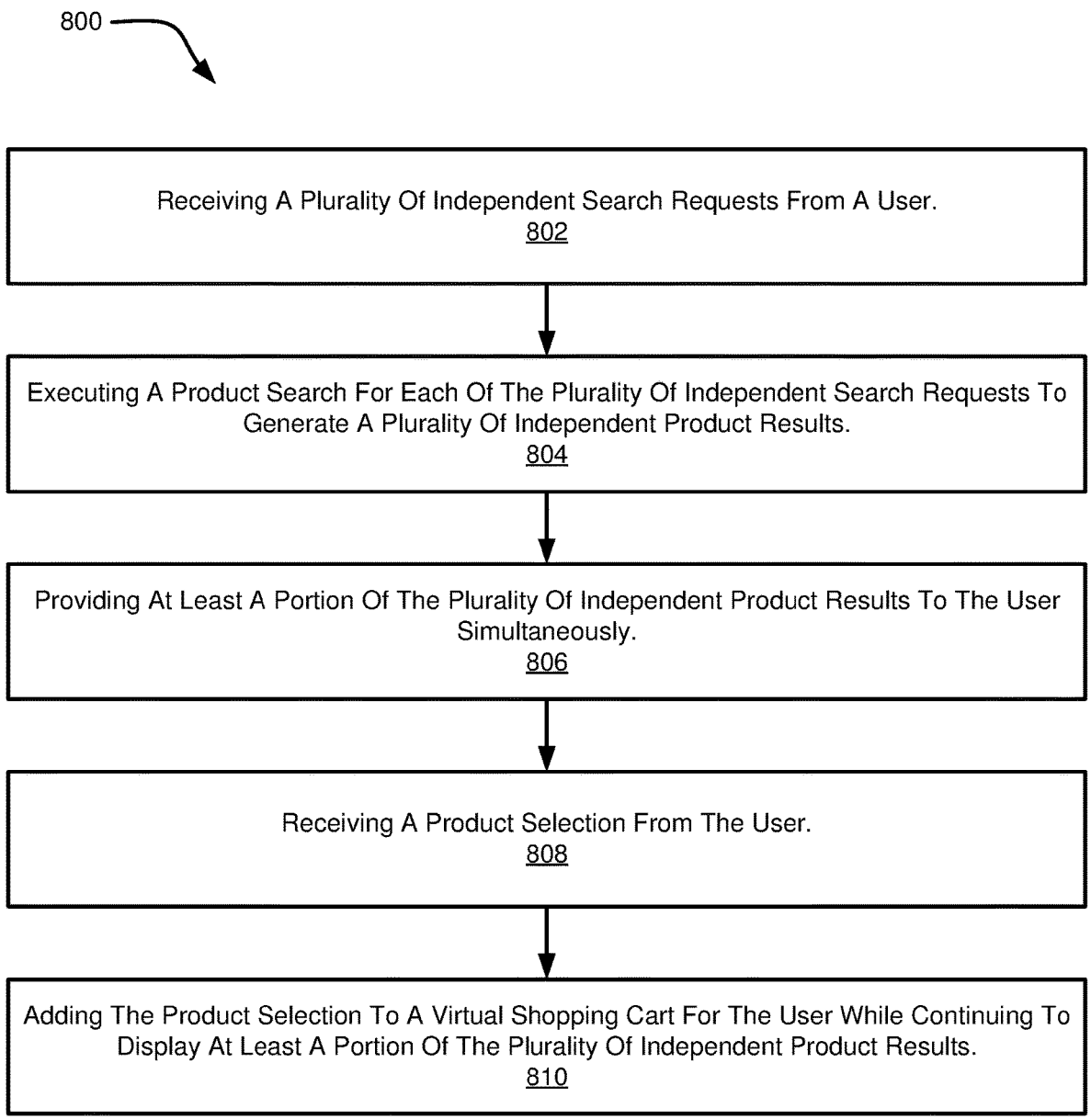
FIG. 8 is a schematic flow chart diagram of a method for efficient multiple-term searching and product identification for processing an order.

FIG. 8 is a schematic flow chart diagram of a method 800 for efficient multiple-term searching and product identification for processing an order. The method 800 may be implemented by one or more processors associated with an order placement platform 102 such as an order placement server 110. The method 800 may be implemented by any suitable computing device and may be implemented by multiple independent computing devices.

The method 800 begins and a computing device receives at 802 a plurality of independent search requests from a user. A computing device executes at 804 a product search for each of the plurality of independent search requests to generate a plurality of independent product results. A computing device provides at 806 at least a portion of the plurality of independent product results to the user simultaneously. A computing device receives at 808 a product selection from the user. A computing device adds at 810 the product selection to a virtual shopping cart for the user while continuing to display at least a portion of the plurality of independent product results.

Figure 9:
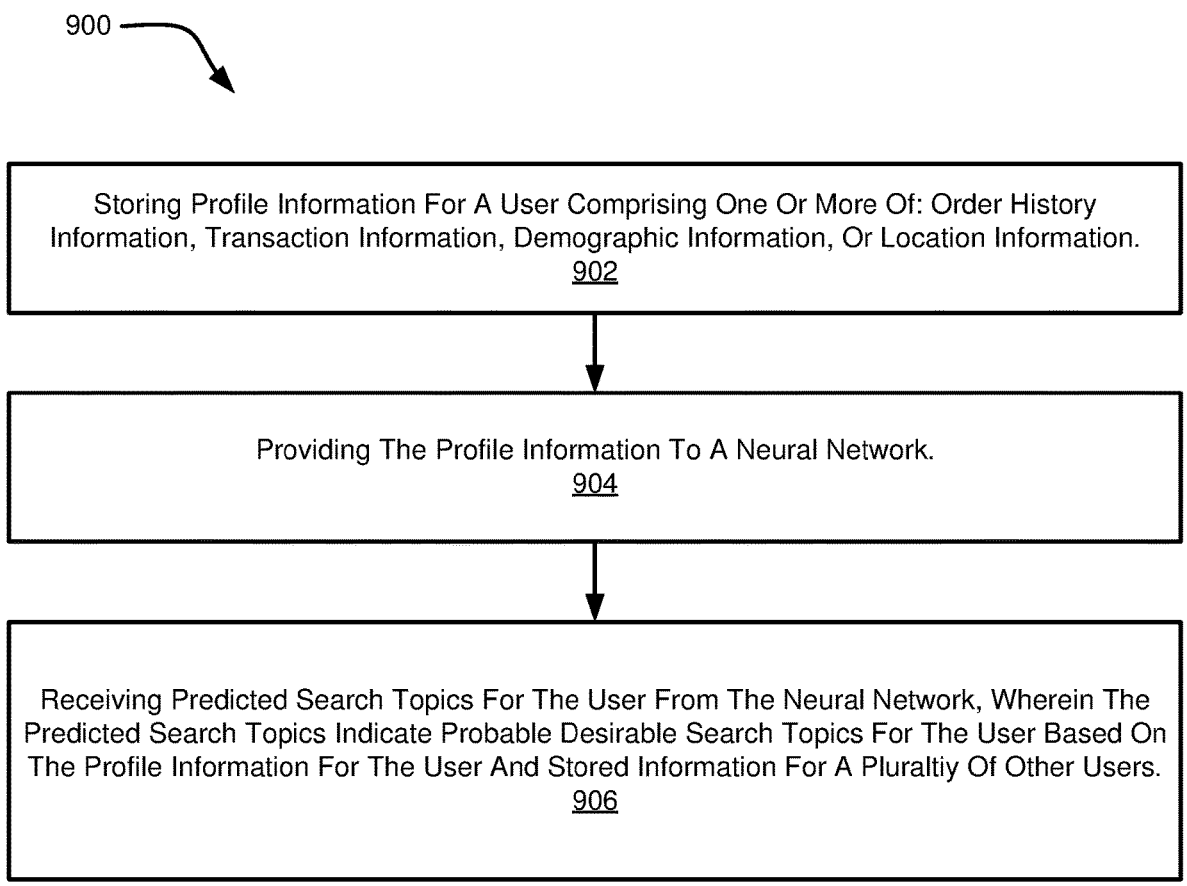
FIG. 9 is a schematic flow chart diagram of a method for identifying predicted search topics by processing information through a neural network.

FIG. 9 is a schematic flow chart diagram of a method 900 for efficient multiple-term searching and product identification for processing an order. The method 900 may be implemented by one or more processors associated with an order placement platform 102 such as an order placement server 110. The method 900 may be implemented by any suitable computing device and may be implemented by multiple independent computing devices.

The method 900 begins and a computing device stores at 902 profile information for a user comprising one or more of: order history information, transaction information, demographic information, or location information. The method 900 continues and a computing device provides at 904 the profile information to a neural network. The method 900 continues and a computing device receives at 906 predicted search topics for the user from the neural network, wherein the predicted search topics indicate probable desirable search topics for the user based on the profile information for the user and stored information for a plurality of other users.

Figure 10:
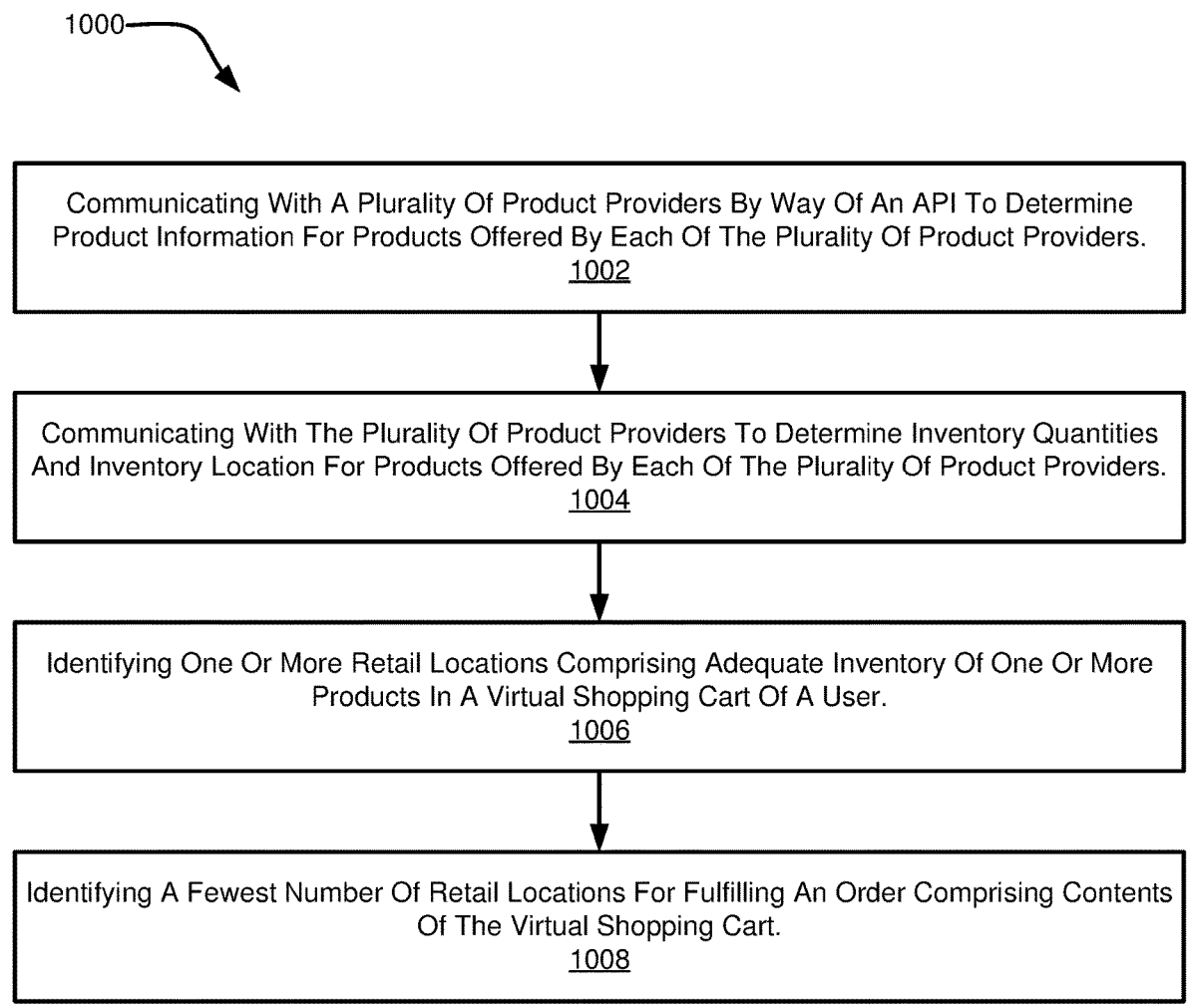
FIG. 10 is a schematic flow chart diagram of a method for identifying available products at a fewest number of retail locations.

FIG. 10 is a schematic flow chart diagram of a method 1000 for efficient multiple-term searching and product identification for processing an order. The method 1000 may be implemented by one or more processors associated with an order placement platform 102 such as an order placement server 110. The method 1000 may be implemented by any suitable computing device and may be implemented by multiple independent computing devices.

The method 1000 begins and a computing device communicates at 1002 with a plurality of product providers by way of an API to determine product information for products offered by each of the plurality of product providers. The method 1000 continues and a computing device communicates at 1004 with the plurality of product providers to determine inventory quantities and inventory location for products offered by each of the plurality of product providers. A computing device identifies at 1006 one or more retail locations comprising adequate inventory of one or more products in a virtual shopping cart of a user. A computing device identifies at 1008 a fewest number of retail locations for fulfilling an order comprising contents of the virtual shopping cart.

Figure 11:
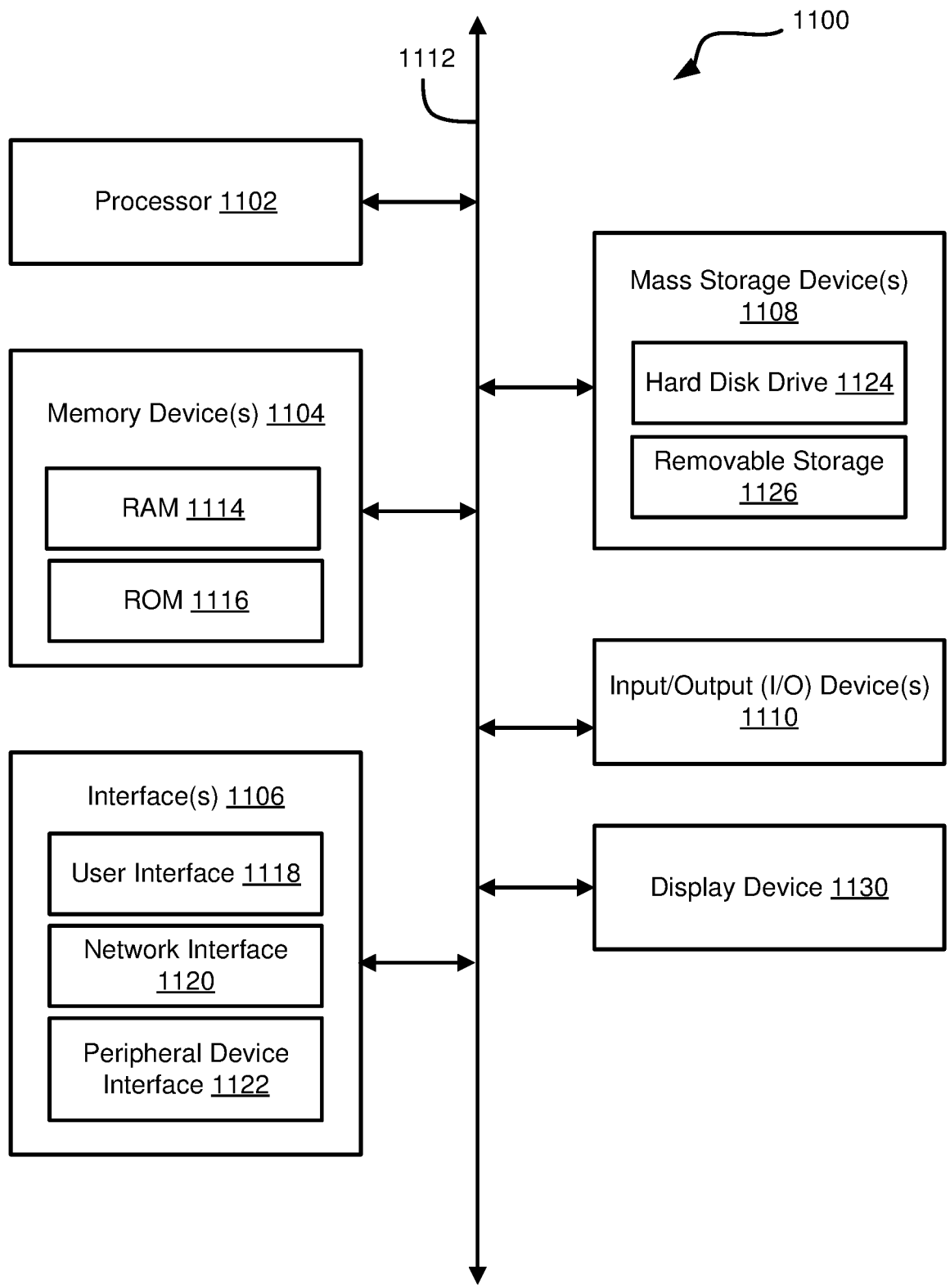
FIG. 11 is a schematic diagram illustrating components of an example computing device.

Referring now to FIG. 11, a block diagram of an example computing device 1100 is illustrated. Computing device 1100 may be used to perform various procedures, such as those discussed herein. Computing device 1100 can perform various monitoring functions as discussed herein, and can execute one or more application programs, such as the application programs or functionality described herein. Computing device 1100 can be any of a wide variety of computing devices, such as a desktop computer, in-dash computer, vehicle control system, a notebook computer, a server computer, a handheld computer, tablet computer and the like.

Computing device 1100 includes one or more processor(s) 1104, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1104 include one or more processors or controllers that execute instructions stored in memory device(s) 1104 and/or mass storage device(s) 1108. Processor(s) 1104 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device 1108 is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1104, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE bus, USB bus, and so forth.

EXAMPLES

The following examples pertain to further embodiments.

Example 1 is a method. The method includes receiving a plurality of independent search requests from a user. The method includes executing a product search for each of the plurality of independent search requests to generate a plurality of independent product results. The method includes providing at least a portion of the plurality of independent product results to the user simultaneously. The method includes receiving a product selection from the user. The method includes adding the product selection to a virtual shopping cart for the user while continuing to display at least a portion of the plurality of independent product results.

Example 2 is a method as in Example 1, wherein the plurality of independent search requests comprise one or more of a search bar input, a search key input, or a selection of a product category suggestion.

Example 3 is a method as in any of Examples 1-2, wherein the plurality of independent search requests are directed to different product categories, and wherein executing the product search for each of the plurality of independent search requests comprises identifying applicable products for each of the different product categories.

Example 4 is a method as in any of Examples 1-3, further comprising predicting one or more product categories applicable to the user based on one or more of: demographic information for the user, location information for the user, order history for the user, transaction history for the user, or preference information for the user, and wherein the method further comprises displaying the one or more predicted product categories to the user as search suggestions.

Example 5 is a method as in any of Examples 1-4, further comprising communicating with a product provider by way of an Application Program Interface (API) to identify available products and one or more of: inventory quantity for one or more products, location of inventory for one or more products, delivery time for one or more products, descriptive information for one or more products, and pricing for one or more products.

Example 6 is a method as in any of Examples 1-5, further comprising communicating with a payment platform by way of an Application Program Interface (API) for processing payment from the user for ordering products stored in the user's virtual shopping cart.

Example 7 is a method as in any of Examples 1-6, wherein receiving the product selection from the user comprises receiving a plurality of product selections from the user and adding each of the plurality of product selections to the virtual shopping cart while continuing to display at least a portion of the plurality of independent product results.

Example 8 is a method as in any of Examples 1-7, further comprising: storing profile information for the user comprising one or more of: order history information, transaction information, demographic information, or location information; providing the profile information to a neural network; and receiving predicted search topics for the user from the neural network, wherein the predicted search topics indicate probable desirable search topics for the user based on the profile information for the user and stored information for a plurality of other users.

Example 9 is a method as in any of Examples 1-8, further comprising: communicating with a plurality of product providers to determine product information for products offered by each of the plurality of product providers; communicating with the plurality of product providers to determine inventory quantities and inventory location for products offered by each of the plurality of product providers; identifying one or more retail locations comprising adequate inventory of one or more products in the virtual shopping cart; and identifying a fewest number of retail locations for fulfilling an order comprising contents of the virtual shopping cart.

Example 10 is a method as in any of Examples 1-9, wherein the one or more retail locations are in close geographic proximity to the user based on a proximity threshold.

Example 11 is a system. The system includes an order placement platform for identifying and ordering products, the order placement platform comprising one or more processors for executing instructions stored in non-transitory computer readable storage media. The instructions include receiving a plurality of independent search requests from a user. The instructions include executing a product search for each of the plurality of independent search requests to generate a plurality of independent product results. The instructions include providing at least a portion of the plurality of independent product results to the user simultaneously. The instructions include receiving a product selection from the user. The instructions include adding the product selection to a virtual shopping cart for the user while continuing to display at least a portion of the plurality of independent product results.

Example 12 is a system as in Example 11, wherein the plurality of independent search requests comprise one or more of a search bar input, a search key input, or a selection of a product category suggestion.

Example 13 is a system as in any of Examples 11-12, wherein the plurality of independent search requests are directed to different product categories, and wherein the instructions are such that executing the product search for each of the plurality of independent search requests comprises identifying applicable products for each of the different product categories.

Example 14 is a system as in any of Examples 11-13, wherein the instructions further comprise predicting one or more product categories applicable to the user based on one or more of: demographic information for the user, location information for the user, order history for the user, transaction history for the user, or preference information for the user, and wherein the instructions further comprise displaying the one or more predicted product categories to the user as search suggestions.

Example 15 is a system as in any of Examples 11-14, wherein the instructions further comprise communicating with a product provider by way of an Application Program Interface (API) to identify available products and one or more of: inventory quantity for one or more products, location of inventory for one or more products, delivery time for one or more products, descriptive information for one or more products, and pricing for one or more products.

Example 16 is a system as in any of Examples 11-15, wherein the instructions further comprise communicating with a payment platform by way of an Application Program Interface (API) for processing payment from the user for ordering products stored in the user's virtual shopping cart.

Example 17 is a system as in any of Examples 11-16, wherein the instructions are such that receiving the product selection from the user comprises receiving a plurality of product selections from the user and adding each of the plurality of product selections to the virtual shopping cart while continuing to display at least a portion of the plurality of independent product results.

Example 18 is a system as in any of Examples 11-17, wherein the instructions further comprise: storing profile information for the user comprising one or more of: order history information, transaction information, demographic information, or location information; providing the profile information to a neural network; and receiving predicted search topics for the user from the neural network, wherein the predicted search topics indicate probable desirable search topics for the user based on the profile information for the user and stored information for a plurality of other users.

Example 19 is a system as in any of Examples 11-18, wherein the instructions further comprise: communicating with a plurality of product providers to determine product information for products offered by each of the plurality of product providers; communicating with the plurality of product providers to determine inventory quantities and inventory location for products offered by each of the plurality of product providers; identifying one or more retail locations comprising adequate inventory of one or more products in the virtual shopping cart; and identifying a fewest number of retail locations for fulfilling an order comprising contents of the virtual shopping cart.

Example 20 is a system as in any of Examples 11-19, wherein the instructions are such that the one or more retail locations are in close geographic proximity to the user based on a proximity threshold.

Example 21 is one or more processors configurable to execute instructions stored in non-transitory computer readable storage media. The instructions include receiving a plurality of independent search requests from a user. The instructions include executing a product search for each of the plurality of independent search requests to generate a plurality of independent product results. The instructions include providing at least a portion of the plurality of independent product results to the user simultaneously. The instructions include receiving a product selection from the user. The instructions include adding the product selection to a virtual shopping cart for the user while continuing to display at least a portion of the plurality of independent product results.

Example 22 is one or more processors as in Example 21, wherein the plurality of independent search requests comprise one or more of a search bar input, a search key input, or a selection of a product category suggestion.

Example 23 is one or more processors as in any of Examples 21-22, wherein the plurality of independent search requests are directed to different product categories, and wherein the instructions are such that executing the product search for each of the plurality of independent search requests comprises identifying applicable products for each of the different product categories.

Example 24 is one or more processors as in any of Examples 21-23, wherein the instructions further comprise predicting one or more product categories applicable to the user based on one or more of: demographic information for the user, location information for the user, order history for the user, transaction history for the user, or preference information for the user, and wherein the instructions further comprise displaying the one or more predicted product categories to the user as search suggestions.

Example 25 is one or more processors as in any of Examples 21-24, wherein the instructions further comprise communicating with a product provider by way of an Application Program Interface (API) to identify available products and one or more of: inventory quantity for one or more products, location of inventory for one or more products, delivery time for one or more products, descriptive information for one or more products, and pricing for one or more products.

Example 26 is one or more processors as in any of Examples 21-25, wherein the instructions further comprise communicating with a payment platform by way of an Application Program Interface (API) for processing payment from the user for ordering products stored in the user's virtual shopping cart.

Example 27 is one or more processors as in any of Examples 21-26, wherein the instructions are such that receiving the product selection from the user comprises receiving a plurality of product selections from the user and adding each of the plurality of product selections to the virtual shopping cart while continuing to display at least a portion of the plurality of independent product results.

Example 28 is one or more processors as in any of Examples 21-27, wherein the instructions further comprise: storing profile information for the user comprising one or more of: order history information, transaction information, demographic information, or location information; providing the profile information to a neural network; and receiving predicted search topics for the user from the neural network, wherein the predicted search topics indicate probable desirable search topics for the user based on the profile information for the user and stored information for a plurality of other users.

Example 29 is one or more processors as in any of Examples 21-28, wherein the instructions further comprise: communicating with a plurality of product providers to determine product information for products offered by each of the plurality of product providers; communicating with the plurality of product providers to determine inventory quantities and inventory location for products offered by each of the plurality of product providers; identifying one or more retail locations comprising adequate inventory of one or more products in the virtual shopping cart; and identifying a fewest number of retail locations for fulfilling an order comprising contents of the virtual shopping cart.

Example 30 is one or more processors as in any of Examples 21-29, wherein the instructions are such that the one or more retail locations are in close geographic proximity to the user based on a proximity threshold.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, televisions, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   receiving, by an order placement server in communication with an order placement platform, a plurality of independent search requests from a user that each identify a product category;
   executing a product search using a multiple term search engine for each of the plurality of independent search requests simultaneously to identify a plurality of independent product results, wherein the plurality of independent product results comprises one or more product results for each product category identified in the plurality of independent search requests, and wherein executing the product search comprises communicating with one or more product databases;
   communicating with one or more product providers by way of an Application Program Interface (API) to retrieve a current inventory data for at least a portion of the plurality of independent product results, wherein the current inventory data comprises a geographical location for currently available inventory;
   providing at least a portion of the one or more product results for each product category to the user simultaneously by way of a user interface rendered on the order placement platform;
   receiving a product selection from the user by way of the order placement platform;
   identifying, based on the current inventory data, local inventory for the product selection that is available within a geographic proximity threshold to a current location for the user; and
   adding the local inventory for the product selection to a virtual shopping cart for the user while continuing to display at least a portion of the one or more product results for each product category.

2. The method of claim 1, wherein the plurality of independent search requests comprises one or more of a search bar input, a search key input, or a selection of a product category suggestion.

3. The method of claim 1, wherein executing the product search for each of the plurality of independent search requests comprises simultaneously and independently searching each product category to identify the one or more product results for each product category.

4. The method of claim 1, further comprising predicting one or more product categories applicable to the user based on one or more of: demographic information for the user, location information for the user, order history for the user, transaction history for the user, or preference information for the user, and wherein the method further comprises displaying the one or more predicted product categories to the user as search suggestions.

5. The method of claim 1, wherein communicating with the one or more product providers by way of the API further comprises identifying: inventory quantity for one or more products, location of inventory for one or more products, delivery time for one or more products, descriptive information for one or more products, and pricing for one or more products.

6. The method of claim 1, further comprising communicating with a payment platform by way of an Application Program Interface (API) for processing payment from the user for ordering products stored in the user's virtual shopping cart.

7. The method of claim 1, wherein receiving the product selection from the user comprises receiving a plurality of product selections from the user and adding each of the plurality of product selections to the virtual shopping cart while continuing to display at least a portion of the plurality of independent product results.

8. The method of claim 1, further comprising:
storing profile information for the user comprising one or more of: order history information, transaction information, demographic information, or location information;
providing the profile information to a neural network; and
receiving predicted search topics for the user from the neural network, wherein the predicted search topics indicate probable desirable search topics for the user based on the profile information for the user and stored information for a plurality of other users.

9. The method of claim 1, further comprising:
communicating with a plurality of product providers to determine product information for products offered by each of the plurality of product providers;
communicating with the plurality of product providers to determine inventory quantities and inventory location for products offered by each of the plurality of product providers;
identifying one or more retail locations comprising adequate inventory of one or more products in the virtual shopping cart; and
identifying a fewest number of retail locations for fulfilling an order comprising contents of the virtual shopping cart.

10. The method of claim 9, wherein the one or more retail locations are within the geographic proximity threshold relative to the current location for the user.

11. The method of claim 1, further comprising reading product information stored in memory to identify one or more of: inventory quantity for one or more products, location of inventory for one or more products, delivery time for one or more products, descriptive information for one or more products, and pricing for one or more products.

12. A system comprising an order placement platform for identifying and ordering products, the order placement platform in communication with an order placement server comprising one or more processors for executing instructions stored in non-transitory computer readable storage media, the instructions comprising:
receiving, by an order placement server in communication with an order placement platform, a plurality of independent search requests from a user that each identify a product category;
executing a product search using a multiple term search engine for each of the plurality of independent search requests simultaneously to identify a plurality of independent product results, wherein the plurality of independent product results comprises one or more product results for each product category identified in the plurality of independent search requests, and wherein executing the product search comprises communicating with one or more product databases;
communicating with one or more product providers by way of an Application Program Interface (API) to retrieve current inventory data for at least a portion of the plurality of independent product results, wherein the current inventory data comprises a geographical location for currently available inventory;
providing at least a portion of the one or more product results for each product category to the user simultaneously by way of a user interface rendered on the order placement platform;
receiving a product selection from the user by way of the order placement platform;
identifying, based on the current inventory data, local inventory for the product selection that is available within a geographic proximity threshold to a current location for the user; and
adding the local inventory for the product selection to a virtual shopping cart for the user while continuing to display at least a portion of the one or more product results for each product category.

13. The system of claim 12, wherein the plurality of independent search requests comprises one or more of a search bar input, a search key input, or a selection of a product category suggestion.

14. The system of claim 12, wherein the instructions are such that executing the product search for each of the plurality of independent search requests comprises simultaneously and independently searching each product category to identify the one or more product results for each product category identifying applicable products for each of the different product categories.

15. The system of claim 12, wherein the instructions further comprise predicting one or more product categories applicable to the user based on one or more of: demographic information for the user, location information for the user, order history for the user, transaction history for the user, or preference information for the user, and wherein the instructions further comprise displaying the one or more predicted product categories to the user as search suggestions.

16. The system of claim 12, wherein the instructions are such that communicating with the one or more product providers by way of the API further comprises identifying: inventory quantity for one or more products, location of inventory for one or more products, delivery time for one or more products, descriptive information for one or more products, and pricing for one or more products.

17. One or more processors configurable to execute instructions stored in non-transitory computer readable storage media, the instructions comprising:
receiving, by an order placement server in communication with an order placement platform, a plurality of independent search requests from a user that each identify a product category;
executing a product search using a multiple term search engine for each of the plurality of independent search requests simultaneously to identify a plurality of independent product results, wherein the plurality of independent product results comprises one or more product results for each product category identified in the plurality of independent search requests, and wherein executing the product search comprises communicating with one or more product databases;

communicating with one or more product providers by way of an Application Program Interface (API) to retrieve current inventory data for at least a portion of the plurality of independent product results, wherein the current inventory data comprises a geographical location for currently available inventory;

providing at least a portion of the one or more product results for each product category to the user simultaneously by way of a user interface rendered on the order placement platform;

receiving a product selection from the user by way of the order placement platform;

identifying, based on the current inventory data, local inventory for the product selection that is available within a geographic proximity threshold to a current location for the user; and adding the local inventory for the product selection to a virtual shopping cart for the user while continuing to display at least a portion of the one or more product results for each product category.

18. The one or more processors of claim 17, wherein the instructions further comprise communicating with a payment platform by way of an Application Program Interface (API) for processing payment from the user for ordering products stored in the user's virtual shopping cart.

19. The one or more processors of claim 17, wherein the instructions are such that receiving the product selection from the user comprises receiving a plurality of product selections from the user and adding each of the plurality of product selections to the virtual shopping cart while continuing to display at least a portion of the plurality of independent product results.

20. The one or more processors of claim 17, wherein the instructions further comprise:

storing profile information for the user comprising one or more of: order history information, transaction information, demographic information, or location information;

providing the profile information to a neural network; and receiving predicted search topics for the user from the neural network, wherein the predicted search topics indicate probable desirable search topics for the user based on the profile information for the user and stored information for a plurality of other users.

21. The one or more processors of claim 17, wherein the instructions further comprise:

communicating with a plurality of product providers to determine product information for products offered by each of the plurality of product providers;

communicating with the plurality of product providers to determine inventory quantities and inventory location for products offered by each of the plurality of product providers;

identifying one or more retail locations comprising adequate inventory of one or more products in the virtual shopping cart; and identifying a fewest number of retail locations for fulfilling an order comprising contents of the virtual shopping cart.

22. The method of claim 1, further comprising determining, based on the current inventory data, whether the local inventory is eligible to be delivered to the current location for the user.

23. The method of claim 1, further comprising determining whether the local inventory can be delivered to the current location for the user within a timeframe specified by the user.

* * * * *